(12) United States Patent
Youn et al.

(10) Patent No.: US 11,366,530 B2
(45) Date of Patent: Jun. 21, 2022

(54) ROLLY KEYBOARD

(71) Applicant: LG ELECTRONICS INC., Seoul (KR)

(72) Inventors: Jinho Youn, Seoul (KR); Hyokune Hwang, Seoul (KR); Jaehyeuck Choi, Seoul (KR); Sooyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 709 days.

(21) Appl. No.: 16/322,655

(22) PCT Filed: Jul. 11, 2017

(86) PCT No.: PCT/KR2017/007388
§ 371 (c)(1),
(2) Date: Feb. 1, 2019

(87) PCT Pub. No.: WO2018/026111
PCT Pub. Date: Feb. 8, 2018

(65) Prior Publication Data
US 2021/0349550 A1    Nov. 11, 2021

(30) Foreign Application Priority Data

Aug. 3, 2016 (KR) .................. 10-2016-0098964

(51) Int. Cl.
*G06F 3/02* (2006.01)
*G06F 3/0354* (2013.01)
*G06F 3/0362* (2013.01)

(52) U.S. Cl.
CPC .......... *G06F 3/0221* (2013.01); *G06F 3/0362* (2013.01); *G06F 3/03543* (2013.01)

(58) Field of Classification Search
CPC .... G06F 3/0216; G06F 3/0221; G06F 3/1666; G06F 1/1669
See application file for complete search history.

(56) References Cited

U.S. PATENT DOCUMENTS

| | | | |
|---|---|---|---|
| 2002/0104957 A1* | 8/2002 | Liess ................. | G01P 3/366 250/221 |
| 2004/0041791 A1* | 3/2004 | Dunker ............... | G06F 3/0213 345/168 |
| 2011/0227828 A1* | 9/2011 | Blandin .............. | G06F 3/03543 345/163 |
| 2015/0324007 A1 | 11/2015 | Lee et al. | |

(Continued)

FOREIGN PATENT DOCUMENTS

| | | |
|---|---|---|
| JP | 2002-132422 A | 5/2002 |
| KR | 2003-0070730 A | 9/2003 |

(Continued)

*Primary Examiner* — Hang Lin
(74) *Attorney, Agent, or Firm* — Birch, Stewart, Kolasch & Birch, LLP

(57) ABSTRACT

The present invention relates to a rolly keyboard. The rolly keyboard comprises: a body having a polygonal columnar shape; a scroll wheel formed in the body; a key assembly coupled to the body, wherein the key assembly comprises a plurality of key line portions in which the keys are disposed in each of a plurality of lines, wherein the plurality of key line portions are wound in the polygonal columnar shape of the body. Thus, scrolling can be accomplished by the scroll wheel.

15 Claims, 21 Drawing Sheets

(56) References Cited

U.S. PATENT DOCUMENTS

| | | | | |
|---|---|---|---|---|
| 2016/0005378 A1* | 1/2016 | Abe | ................. | G09G 5/003 |
| | | | | 345/520 |
| 2016/0098097 A1* | 4/2016 | Chang | ................. | F16M 11/38 |
| | | | | 345/169 |
| 2016/0367189 A1* | 12/2016 | Aimone | ................. | A61B 5/291 |

FOREIGN PATENT DOCUMENTS

| | | |
|---|---|---|
| KR | 20-2009-0000238 U | 1/2009 |
| KR | 10-1108488 B1 | 2/2012 |
| KR | 10-1587182 B1 | 2/2016 |
| WO | WO 2015/112888 A1 | 7/2015 |

* cited by examiner

ROLLY KEYBOARD

CROSS REFERENCE TO RELATED APPLICATIONS

This application is the National Phase of PCT International Application No. PCT/KR2017/007388, filed on Jul. 11, 2017, which claims priority under 35 U.S.C. 119(a) to Patent Application No. 10-2016-0098964, filed in the Republic of Korea on Aug. 3, 2016, all of which are hereby expressly incorporated by reference into, the present application.

TECHNICAL FIELD

The present invention relates to a rolly keyboard, and more particularly, to a rolly keyboard which has a scroll wheel to perform scrolling.

BACKGROUND ART

A keyboard is an apparatus which has a plurality of keys, and used to display a corresponding character in a connected display apparatus according to a user's key input.

Usually, a keyboard is separately connected to a desk top computer, among a personal computer, and in a portable lap top computer, a keyboard is mounted inside thereof.

Meanwhile, among portable display apparatuses, an apparatus such as smart phone, tablet PC is inconvenient to input characters, and in particular, a virtual keyboard is displayed on a display unit so as to input characters based on a touch.

However, even when such a virtual keyboard is used, there exists an inconvenient that the input of character is restricted.

Accordingly, various attempts have been made to develop a portable keyboard.

DISCLOSURE

Technical Problem

The present invention has been made in view of the above problems, and provides a rolly keyboard which has a scroll wheel to perform scrolling.

Technical Solution

In accordance with an aspect of the present invention, a rolly keyboard includes: a body having a polygonal columnar shape; a scroll wheel formed in the body; a key assembly coupled to the body, wherein the key assembly comprises a plurality of key line portions in which the keys are disposed in each of a plurality of lines, wherein the plurality of key line portions are wound in the polygonal columnar shape of the body.

In accordance with another aspect of the present invention, a rolly keyboard includes: a body having a polygonal columnar shape; and a key assembly coupled to the body, wherein the key assembly includes: a plurality of key line portions in which the keys are disposed in each of a plurality of lines; and a scroll wheel formed in any one of the plurality of key line portions, wherein the plurality of key line portions are wound in the polygonal columnar shape of the body.

In accordance with another aspect of the present invention, a rolly keyboard includes: a body having a polygonal columnar shape; a display formed in the body; a key assembly coupled to the body, wherein the key assembly includes a plurality of key line portions in which the keys are disposed in each of a plurality of lines, wherein the plurality of key line portions are wound in the polygonal columnar shape of the body.

Advantageous Effects

A rolly keyboard according to an embodiment of the present invention includes: a body having a polygonal columnar shape; a scroll wheel formed in the body; a key assembly coupled to the body, wherein the key assembly includes a plurality of key line portions in which the keys are disposed in each of a plurality of lines, wherein the plurality of key line portions are wound in the polygonal columnar shape of the body. Thus, a rolly keyboard folded in the form of a roll can be used, thereby making it easy to carry. Furthermore, since a scroll wheel is provided, scrolling is simplified.

Meanwhile, a rolly keyboard according to another embodiment of the present invention includes: a body having a polygonal columnar shape; and a key assembly coupled to the body, wherein the key assembly includes: a plurality of key line portions in which the keys are disposed in each of a plurality of lines; and a scroll wheel formed in any one of the plurality of key line portions, wherein the plurality of key line portions are wound in the polygonal columnar shape of the body. Thus, a rolly keyboard folded in the form of a roll can be used, thereby making it easy to carry. Furthermore, since a scroll wheel is provided, scrolling is simplified.

Meanwhile, the rolly keyboard further includes: a cable which is connected and extended from an end of the body; and a mouse which is connected to the cable, so that the mouse function can be easily utilized in addition to the scrolling function.

Meanwhile, the rolly keyboard further includes: an optical mouse disposed in any one of the plurality of key line portions or in the body, so that the mouse function can be easily utilized in addition to the scrolling function.

Meanwhile, the rolly keyboard further includes a light output unit and a light reception unit, detects movement information of user's hand, and controls to transmit the movement information, as pointing data, to the display apparatus, so that the mouse function can be easily implemented.

Meanwhile, the rolly keyboard further includes an infrared sensor unit, controls to supply power to the communication unit when a sensing signal is detected by the infrared sensor unit in a state in which the key assembly is unfolded from the body, thereby reducing power consumption.

Meanwhile, a rolly keyboard according to another embodiment of the present invention includes: a body having a polygonal columnar shape; a display formed in the body; a key assembly coupled to the body, wherein the key assembly includes a plurality of key line portions in which the keys are disposed in each of a plurality of lines, wherein the plurality of key line portions are wound in the polygonal columnar shape of the body.

Accordingly, a rolly keyboard folded in the form of a roll can be used, thereby making it easy to carry. Furthermore, since a display is provided, remote control of the display apparatus can be performed more smoothly.

Particularly, based on application information received from the display apparatus, in a state where a corresponding application icon is displayed on the display, when a first application icon is selected, first application execution information is transmitted to the display apparatus, and first key data is transmitted to the display apparatus when a first key of the plurality of keys is operated, so that application execution and character input can be easily performed in a mobile terminal or the like.

MODE FOR INVENTION

Figure 1:
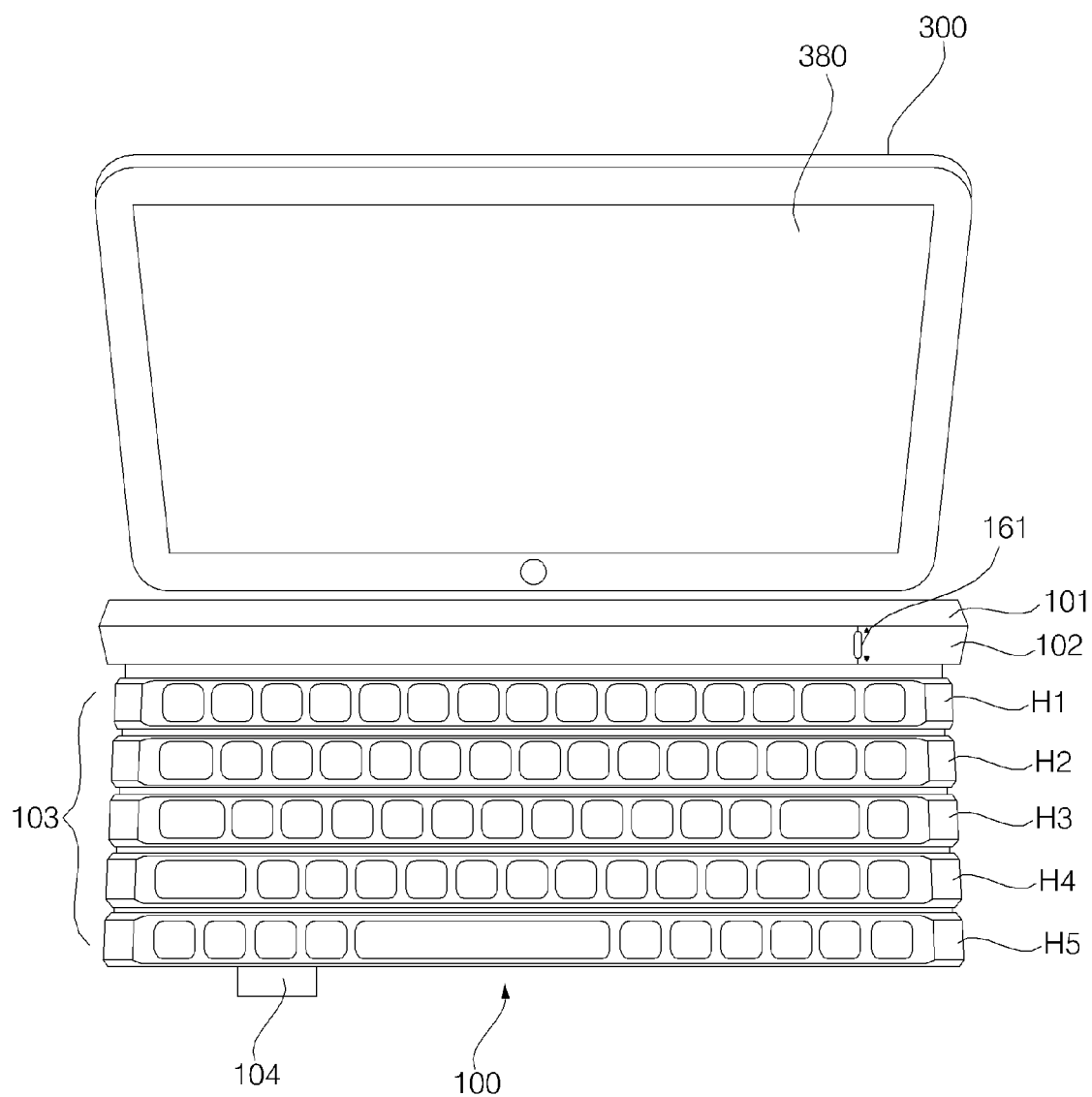
FIG. 1 is a diagram illustrating a rolly keyboard and a display apparatus according to an embodiment of the present invention.

Hereinafter, preferred embodiments of the present invention will be described with reference to the accompanying drawings. In describing the present embodiment, the same designations and the same reference numerals are used for the same components, and further description thereof will be omitted.

Figure 2:
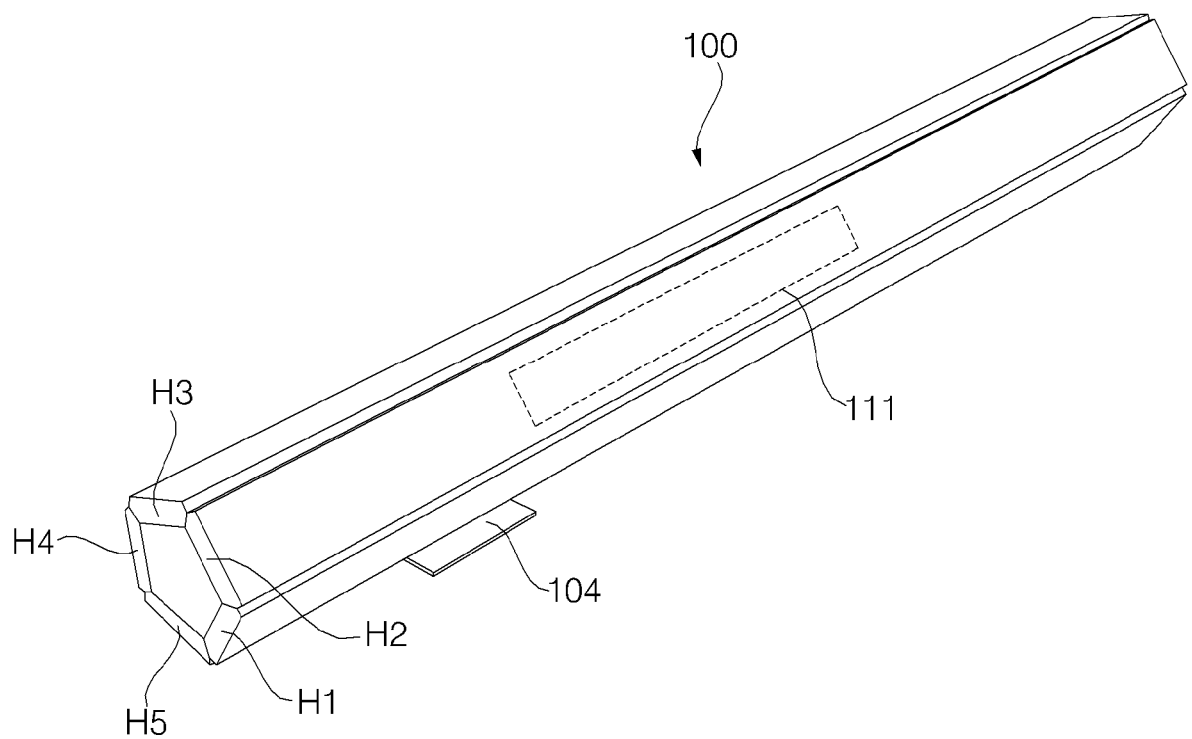
FIG. 2 is a diagram illustrating the rolly keyboard of FIG. 1 that is rolled.

FIG. 1 is a diagram illustrating a rolly keyboard and a display apparatus according to an embodiment of the present invention, and FIG. 2 is a diagram illustrating the rolly keyboard of FIG. 1 that is rolled.

Referring to the drawing, a rolly keyboard 100 of FIG. 1 may be wirelessly connected to a display apparatus 300, and be used to input various texts such as characters, numbers, symbols, and the like to a display 380 in the display apparatus 100.

Meanwhile, the rolly keyboard 100 according to the embodiment of the present invention may be a portable keyboard, and may be wound as shown in FIG. 2.

To this end, the rolly keyboard 100 may include a body 101 having a polygonal columnar shape, and a key assembly 103 which is connected to the body 101 and has a plurality of keys disposed thereon.

Meanwhile, the key assembly 103 may include a plurality of key line portions H1 to H5 in which the keys are disposed in each of a plurality of lines. By operation of a user, the plurality of key line portions H1 to H5 may be wound in the polygonal columnar shape of the body 101.

Particularly, the rolly keyboard 100 may include a magnet in the body 101. When the plurality of key line portions H1 to H5 of the key assembly 103 are formed of a metal material, the plurality of key line portions H1 to H5 may be easily wound into the polygonal columnar shape of the body 101 due to the magnet in the body 101. Such a rolly keyboard has an advantage that it is easy to carry.

Referring to FIG. 2, a first key line portion h1 closest to the body 101 is wound first, second to fifth key line portions H2 to H5 are wound sequentially, and finally, all of the plurality of key line portions H1 to H5 are wound.

Meanwhile, a protrusion 104 connected to a part of the fifth key line portion H5 may be further provided to unfold the key assembly 103 having the plurality of key line portions H1 to H5 that are wound.

As a user pulls the protrusion 104, the key assembly 103 is unfolded as shown in FIG. 1 from FIG. 2.

Meanwhile, the rolly keyboard 100 according to the embodiment of the present invention is provided with a scroll wheel 161 so as to perform scrolling smoothly when a document, a web screen, or the like is displayed on the display 380 in the display apparatus 100, as well as the input of various texts such as character, number, symbol. Thus, scrolling may be performed easily. This will be described in more detail with reference to FIG. 4 and below.

Meanwhile, the display apparatus 300 may be various apparatuses such as a mobile terminal, a tablet PC, a monitor, a TV.

Figure 3:
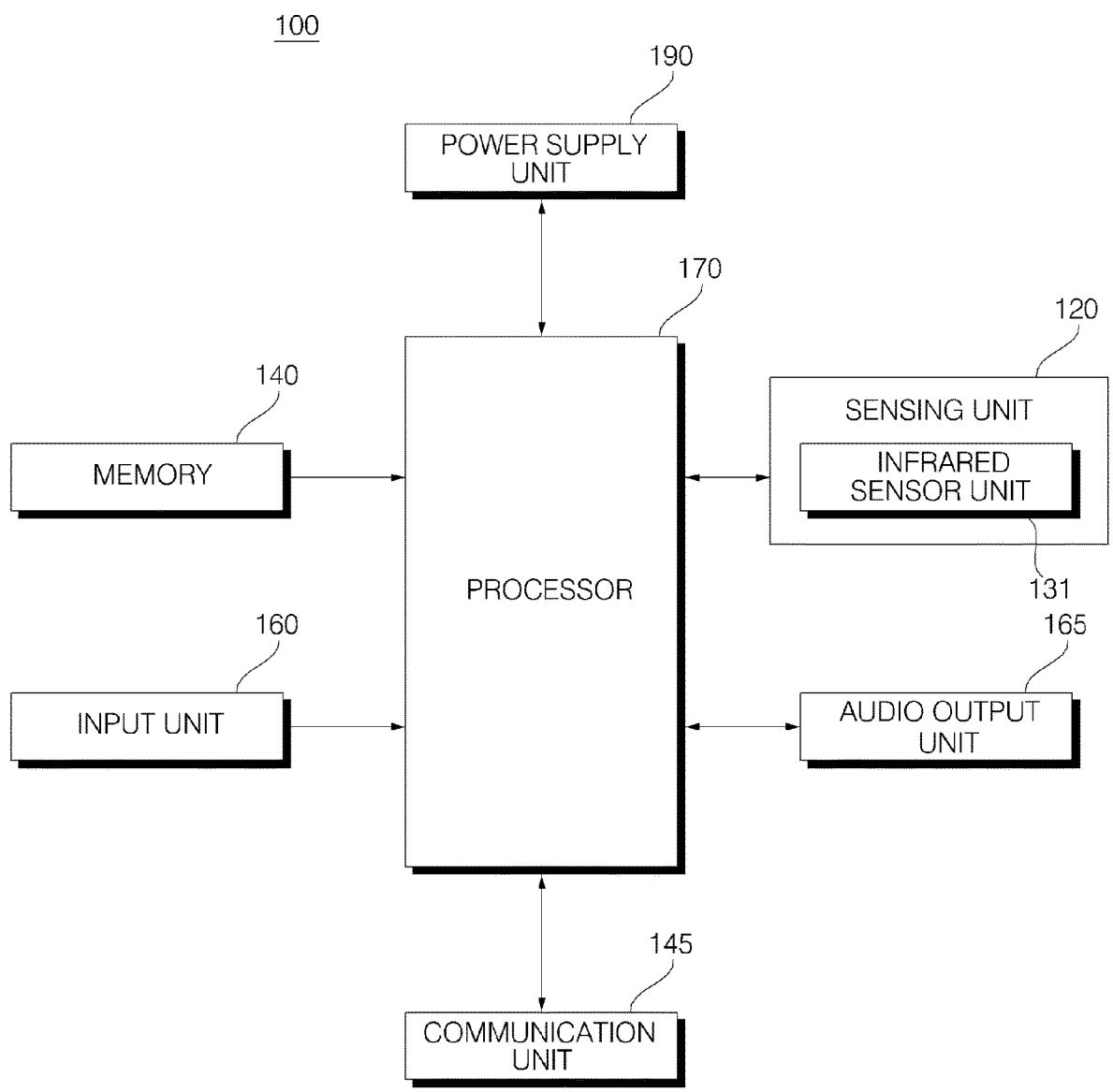
FIG. 3 is an example of an internal block diagram of the rolly keyboard of FIG. 1.

FIG. 3 is an example of an internal block diagram of the rolly keyboard of FIG. 1.

Referring to the drawing, the rolly keyboard 100 may include a sensing unit 120, a communication unit 145, a memory 140, an input unit 160, an audio output unit 165, a processor 170, and a power supply unit 190. When such components are implemented in practical applications, as necessary, two or more components may be combined into one component, or one component may be divided into two or more components.

The sensing unit 120 may sense the case where the rolly keyboard 100 is unfolded. To this end, an infrared sensor unit 131 may be provided.

The infrared sensor unit 131 may include an infrared light output unit EMa disposed in the body 101 and outputs an infrared light, and an infrared light reception unit PDa which receives a light corresponding to the outputted infrared light.

When a sensing signal is detected by the infrared sensor unit 131 in a state where the key assembly 103 is unfolded from the body 101, the infrared sensor unit 131 may send the detected sensing signal to a processor 170. At this time, the processor 170 may control to supply power to various units, such as the communication unit 145, in the rolly keyboard 100.

The communication unit 145 may provide an interface for communication with an external apparatus. To this end, the communication unit 145 may include at least one of a wireless Internet module (not shown), a short distance communication module (not shown), and a GPS module (not shown).

For example, the communication unit 145 may perform Bluetooth communication, WiFi communication, or the like, thereby transmitting an operation signal operated in the key assembly 103 to the paired display apparatus 300.

Meanwhile, when the communication unit 145 includes a GPS module (not shown), based on a position signal from the GPS module, the processor may perform a setting for a language input corresponding to a relevant position signal to a plurality of keys in the key assembly 103.

For example, in the case of a position signal corresponding to Korea, the processor 170 may assign a key for Hangul input. For another example, in the case of a position signal corresponding to China, the processor 170 may assign a key for Chinese input.

The memory 140 may store a program for processing or controlling the processor 170 in the rolly keyboard 100, and may serve to temporarily store the inputted or outputted data.

In particular, the memory 140 may store character information, number information, symbol information, and the like corresponding to a plurality of keys in the rolly keyboard 100.

The input unit 160 may include a plurality of keys in the key assembly 103.

Meanwhile, the input unit 160 may include a scroll wheel 161.

In addition to the input of character, number, and symbol, scrolling may be performed by the operation of the input unit 160.

The audio output unit 165 may output a corresponding sound, when a certain key of the plurality of keys is operated, or when the scroll wheel 161 is operated.

Alternatively, the audio output unit 165 may output a corresponding sound when the power is turned on or when the power is turned off.

The processor 170 may control the operation of each unit in the rolly keyboard 100 so as to control the overall operation of the rolly keyboard 100.

The processor 170 may control to transmit a first key data to the display apparatus 300, when the first key of the plurality of keys is operated.

Meanwhile, the processor 170 may control to transmit scroll operation data to the display apparatus 300, when the scroll wheel 161 is operated.

Meanwhile, the processor 170 may control to transmit a pairing request signal for pairing with an adjacent display apparatus 300, when the power is turned on.

When receiving the pairing response signal from the display apparatus 300, the processor 1700 may complete the pairing and control to connect with the display apparatus 300.

Meanwhile, when the rolly keyboard 100 includes a light output unit EM1 to EM3 and a light reception unit PD1, PD2, the processor 170 may control to detect movement information of user's hand 400, and transmit the movement information as pointing data to the display apparatus 300, based on an output light outputted from the light output unit EM1 to EM3 and a reception light received by the light reception unit PD1 to PD2.

Meanwhile, when the rolly keyboard 100 is provided with a mouse, the processor 170 may control to transmit pointing data from the mouse to the display apparatus 300.

Meanwhile, in a case where the rolly keyboard 170 is provided with an infrared sensor unit 131, when the infrared sensor unit 131 detects a sensing signal in a state where the key assembly 103 is unfolded from the body 101, the processor 170 may control power to be supplied to the communication unit 145.

The power supply unit 190 receives external power and internal power under the control of the processor 170, and supplies power required for operation of respective components.

In particular, the power supply unit 190 may include a rechargeable battery (not shown).

Meanwhile, the block diagram of the rolly keyboard 100 shown in FIG. 2 is a block diagram for an embodiment of the present invention. Each component of the block diagram may be integrated, added, or omitted, depending on the specifications of the rolly keyboard 100 actually implemented. That is, if necessary, two or more components may be combined into one component, or one component may be divided into two or more components. In addition, the functions performed in each block are intended to illustrate the embodiment of the present invention, and the specific operation and apparatus do not limit the scope of the present invention.

Figure 4:
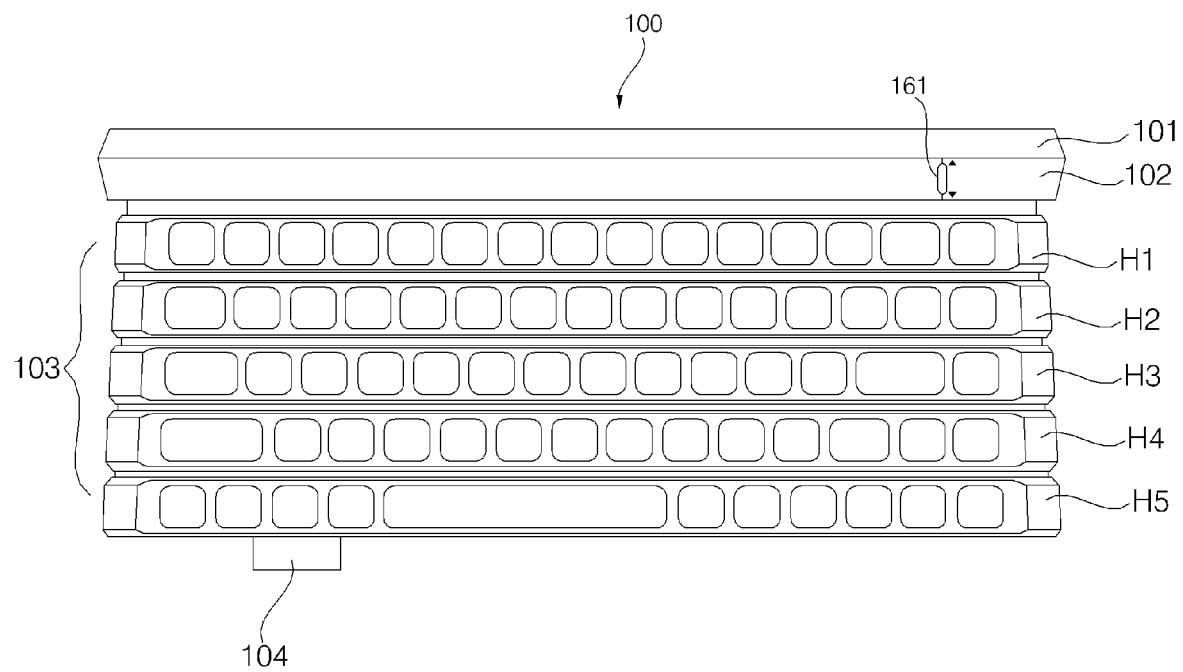
FIG. 4 is a diagram illustrating a rolly keyboard according to an embodiment of the present invention.

FIG. 4 is a diagram illustrating a rolly keyboard according to an embodiment of the present invention.

Referring to the drawing, the rolly keyboard 100 of FIG. 4 includes a body 101 having a polygonal columnar shape, a scroll wheel 161 formed in the body 101, and a key assembly 103 which is coupled to the body 101 and has a plurality of keys disposed therein. The key assembly 103 includes a plurality of key line portions H1 to H5 in which the keys are disposed in each of a plurality of lines, and the plurality of key line portions H1 to H5 are wound in the polygonal columnar shape of the body 101. Thus, a rolly keyboard folded in the form of a roll can be used, thereby achieving an easy carry. Furthermore, since a scroll wheel is provided, scrolling is simplified.

Particularly, the rolly keyboard 100 of FIG. 4 is characterized in that the scroll wheel 161 is formed in a first surface 102 of a plurality of surfaces of the body 101.

Figure 7A:
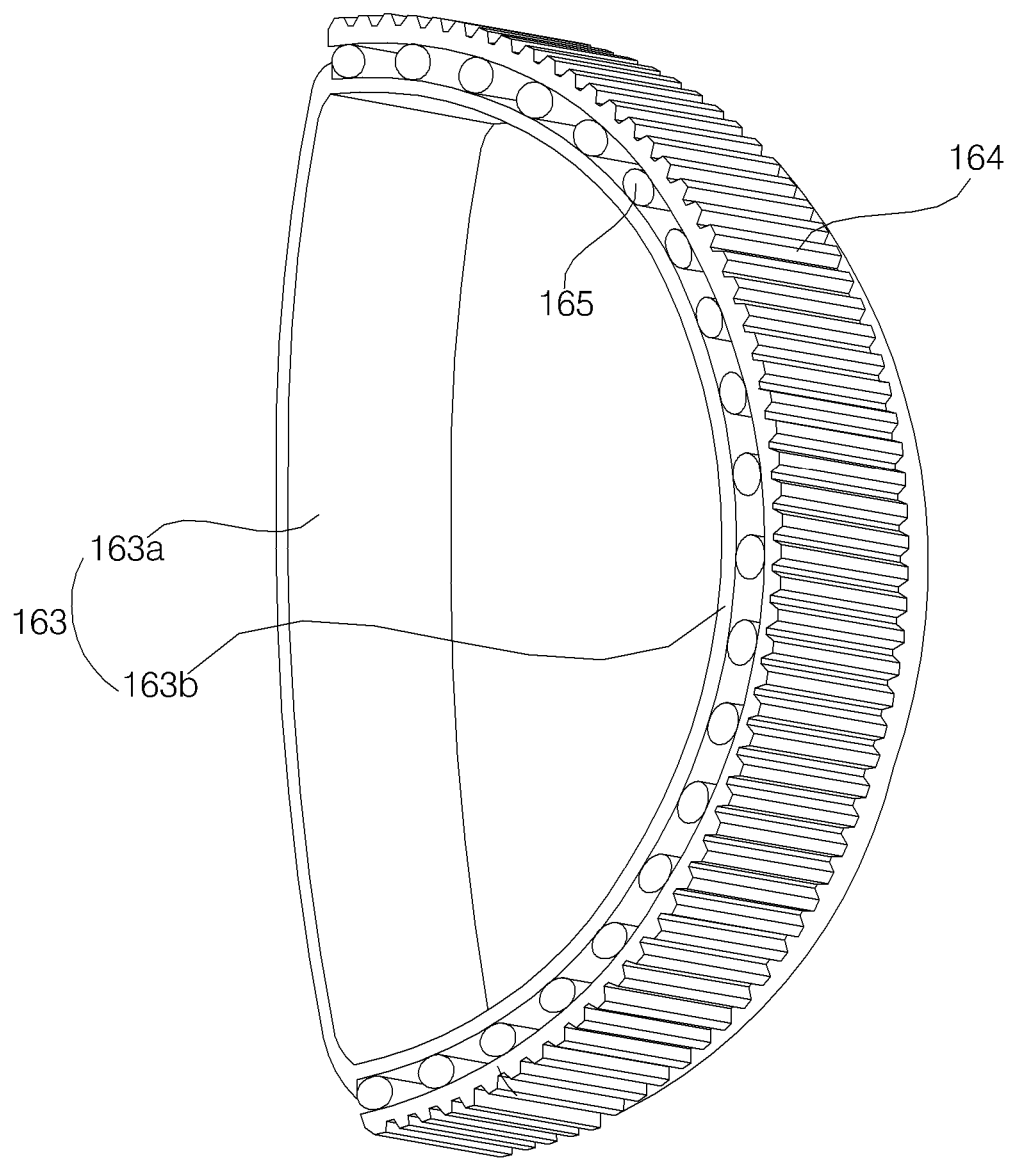
FIGS. 7A and 7B are enlarged views of a scroll wheel of FIG. 6.
Figure 7B:
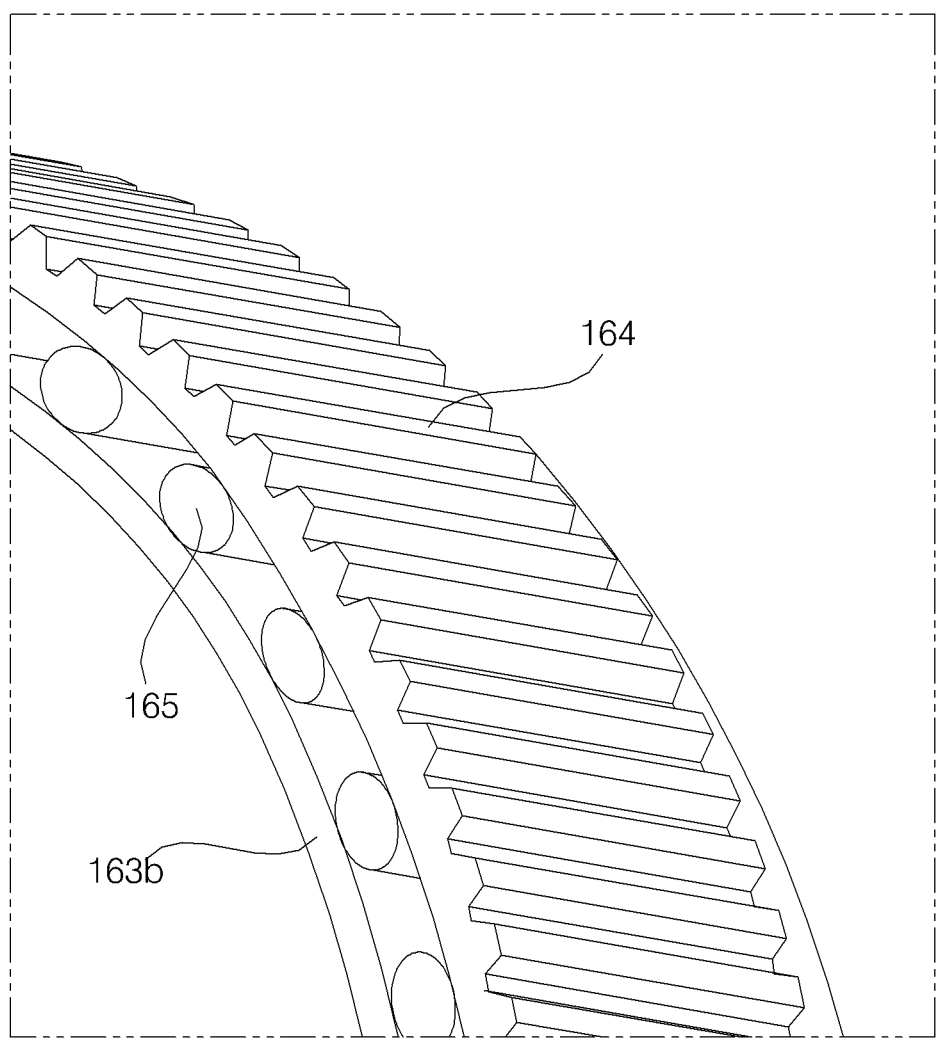

As shown in FIGS. 7A and 7B, the scroll wheel 161 may include a wheel base 163 which has a first base 163a and a second base 163b that is connected to the first base 163a and has a curved shape, a bearing 165 disposed on the wheel base 163, and a wheel cover 164 disposed on the bearing 165.

The first base 163a may be a straight base and the second base 163b may be a curved base. The outer appearance of the scroll wheel 161 formed in the first surface may be shown as a curved shape due to the curved shape of the second base 163b.

Meanwhile, for scrolling, a plurality of bearings 165 may be disposed on the wheel base 163, and the wheel cover 164 disposed on the bearing 165 may be disposed.

Figure 5A:
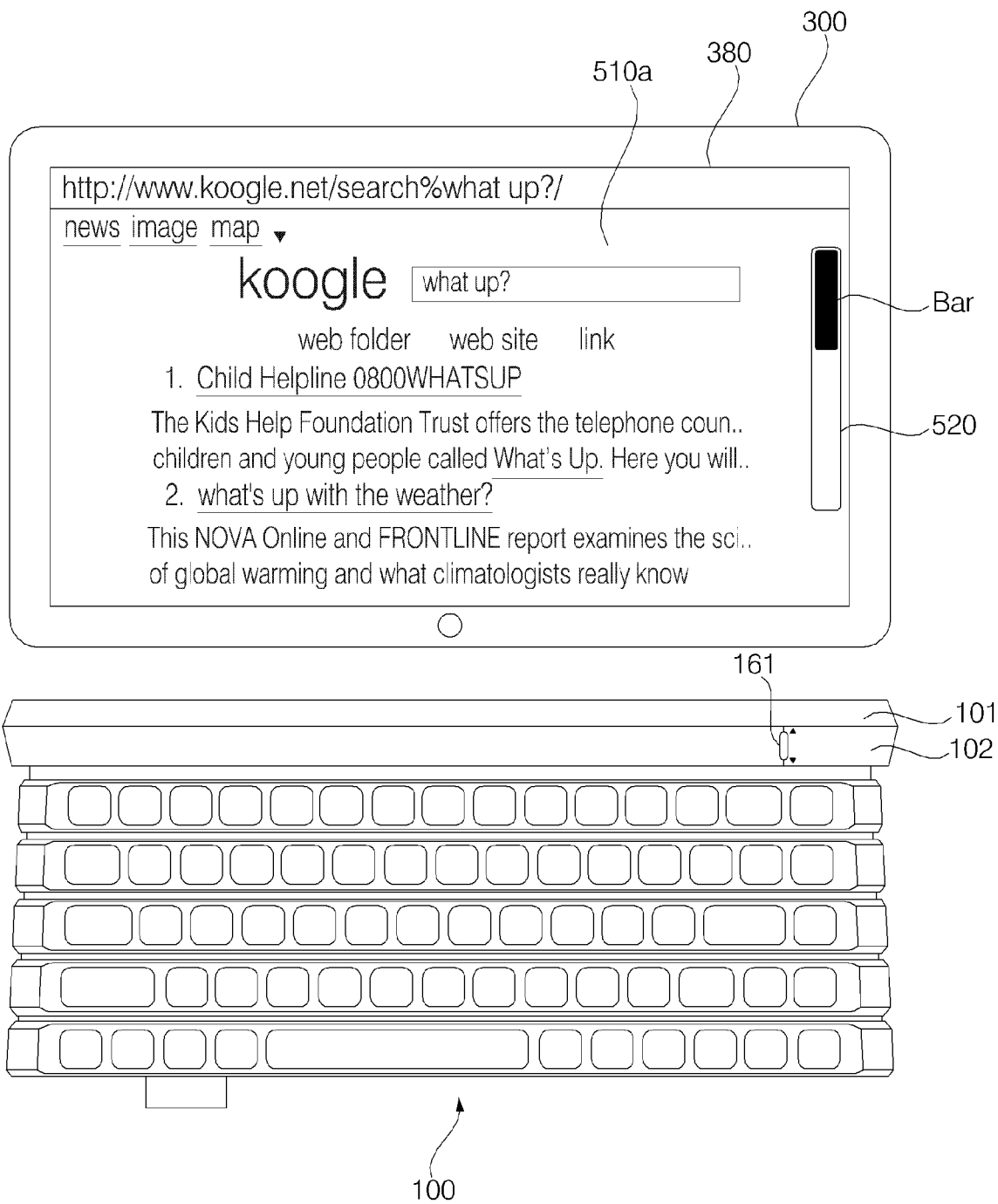
FIGS. 5A and 5B are diagrams for explaining the operation of the rolly keyboard of FIG. 4.
Figure 5B:
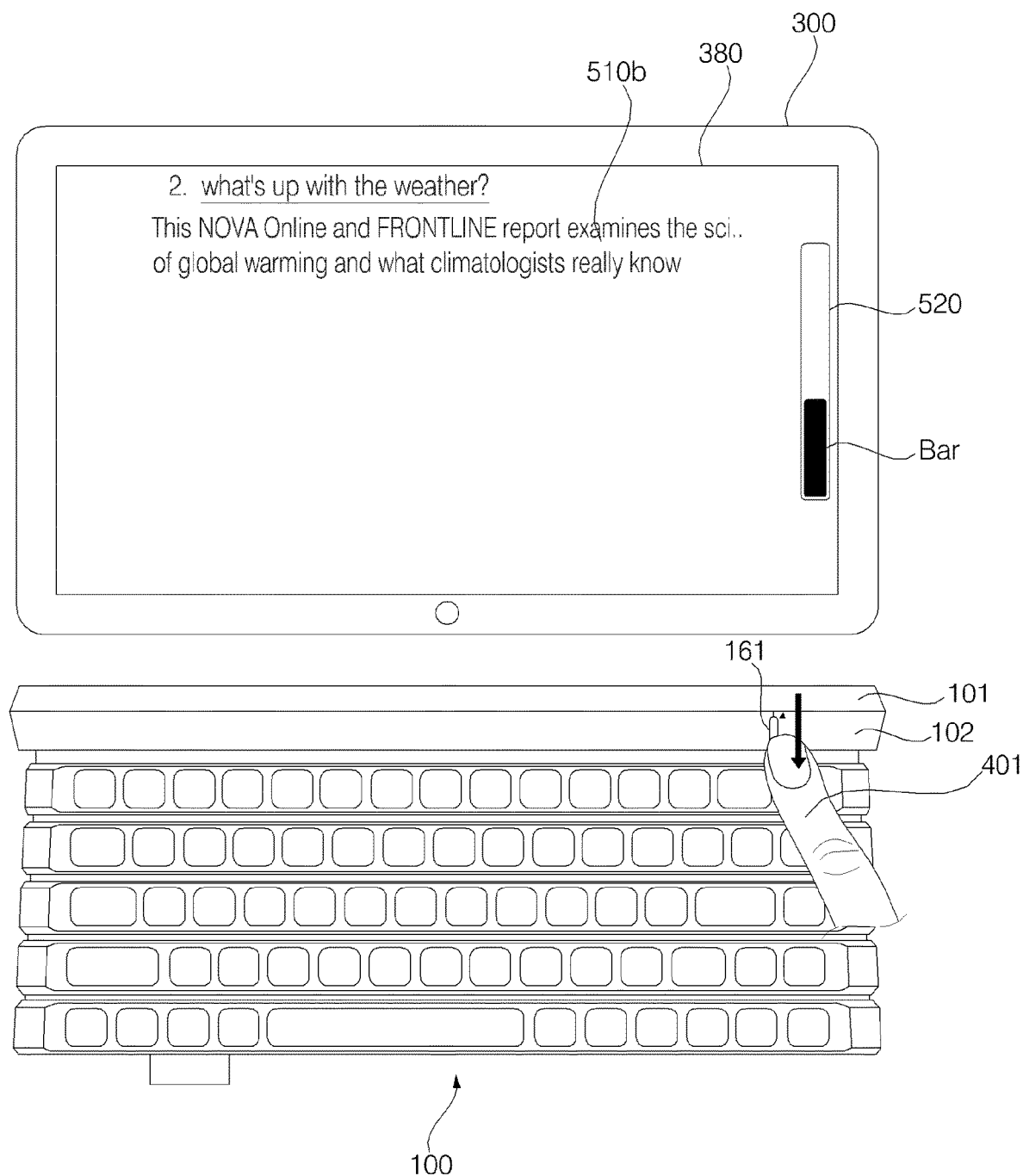

FIGS. 5A and 5B are diagrams for explaining the operation of the rolly keyboard of FIG. 4.

FIG. 5A illustrates that a web screen 510a is displayed on the display 380 of the display apparatus 300.

A scroll bar area 520 and a scroll bar are displayed in the web screen 510a, and, in the drawing, it is shown that the scroll bar is positioned in an upper end of the scroll bar area 520.

FIG. 5B illustrates that the scroll wheel 161 is scrolled down by user's hand 401.

Accordingly, the web screen 51a shown in FIG. 5A is down scrolled, and the down scrolled web screen 510b may be displayed as shown in FIG. 5B.

The scroll bar area 520 and the scroll bar are displayed in the down scrolled web screen 510b, and, in the drawing, it is shown that the scroll bar is positioned in the lower end of the scroll bar area 520.

The processor 170 may control to transmit scroll operation data to the display apparatus 300 during operation of the scroll wheel 161.

In particular, as shown in the drawing, the processor 170 may control to transmit down scroll operation data to the display apparatus 300 when the scroll wheel 161 is operated in a downward direction.

Meanwhile, as shown in FIG. 7A, in a state where a search window is displayed in the web screen 510*a*, when a first key of a plurality of keys operates, the processor 170 may control to transmit a first key data to the display apparatus 300.

Figure 6:
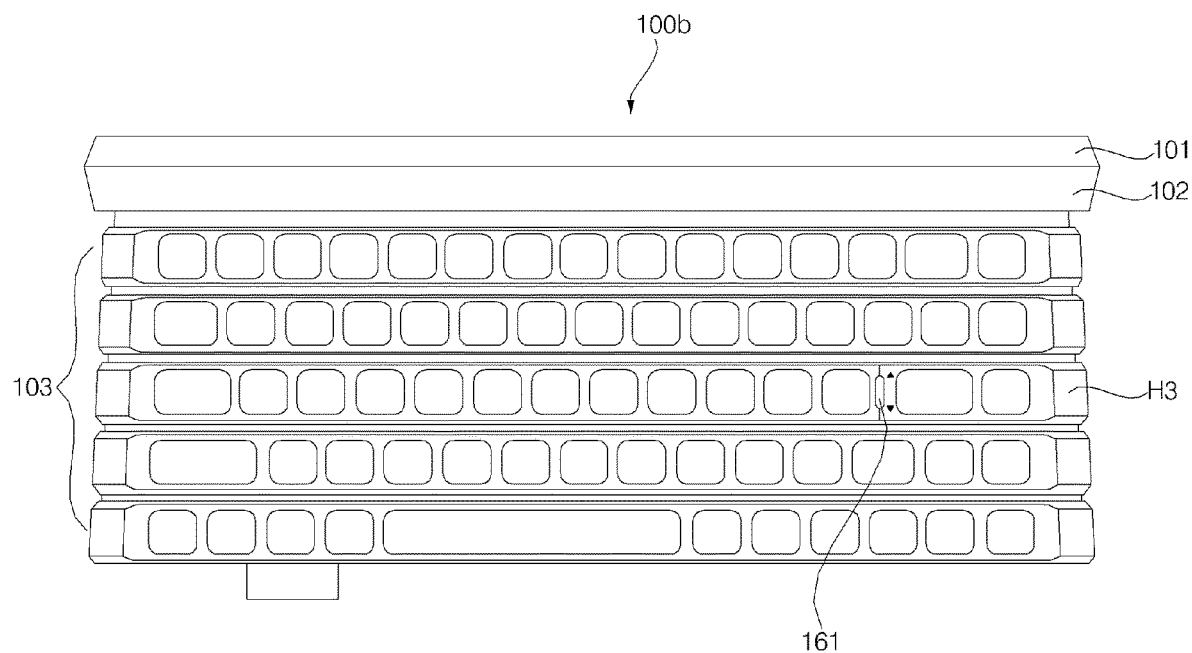
FIG. 6 is a diagram illustrating a rolly keyboard according to another embodiment of the present invention.

FIG. 6 is a diagram illustrating a rolly keyboard according to another embodiment of the present invention.

Referring to the drawings, a rolly keyboard 100*b* according to another embodiment of the present invention may include a body 101 which has a polygonal columnar shape 101, and a key assembly 103 which is coupled to the body 101 and has a plurality of keys disposed therein.

The key assembly 103 may include a plurality of key line portions H1 to H5 in which the keys are disposed in each of a plurality of lines and a scroll wheel 161 disposed in any one of the plurality of key line portions H1 to H5, and the plurality of key line portions H1 to H5 are wound in the polygonal columnar shape of the body 101.

Thus, a rolly keyboard folded in the form of a roll can be used, thereby making it easy to carry. Furthermore, since a scroll wheel is provided, scrolling is simplified.

Particularly, the rolly keyboard 100 of FIG. 4 is characterized in that the scroll wheel 161 is formed in a third key line portion H1 to H5 of the plurality of key line portions H1 to H5.

FIGS. 7A and 7B are enlarged views of the scroll wheel of FIG. 6.

Referring to the drawings, the scroll wheel 161 may include a wheel base 163 which has a first base 163*a* and a second base 163*b* that is connected to the first base 163*a* and has a curved shape, a bearing 165 disposed on the wheel base 163, and a wheel cover 164 disposed on the bearing 165.

The first base 163*a* may be a straight base and the second base 163*b* may be a curved base. The outer appearance of the scroll wheel 161 formed in the first surface may be shown as a curved shape due to the curved shape of the second base 163*b*.

Meanwhile, for scrolling, a plurality of bearings 165 may be disposed on the wheel base 163, and the wheel cover 164 disposed on the bearing 165 may be disposed.

Figure 8A:
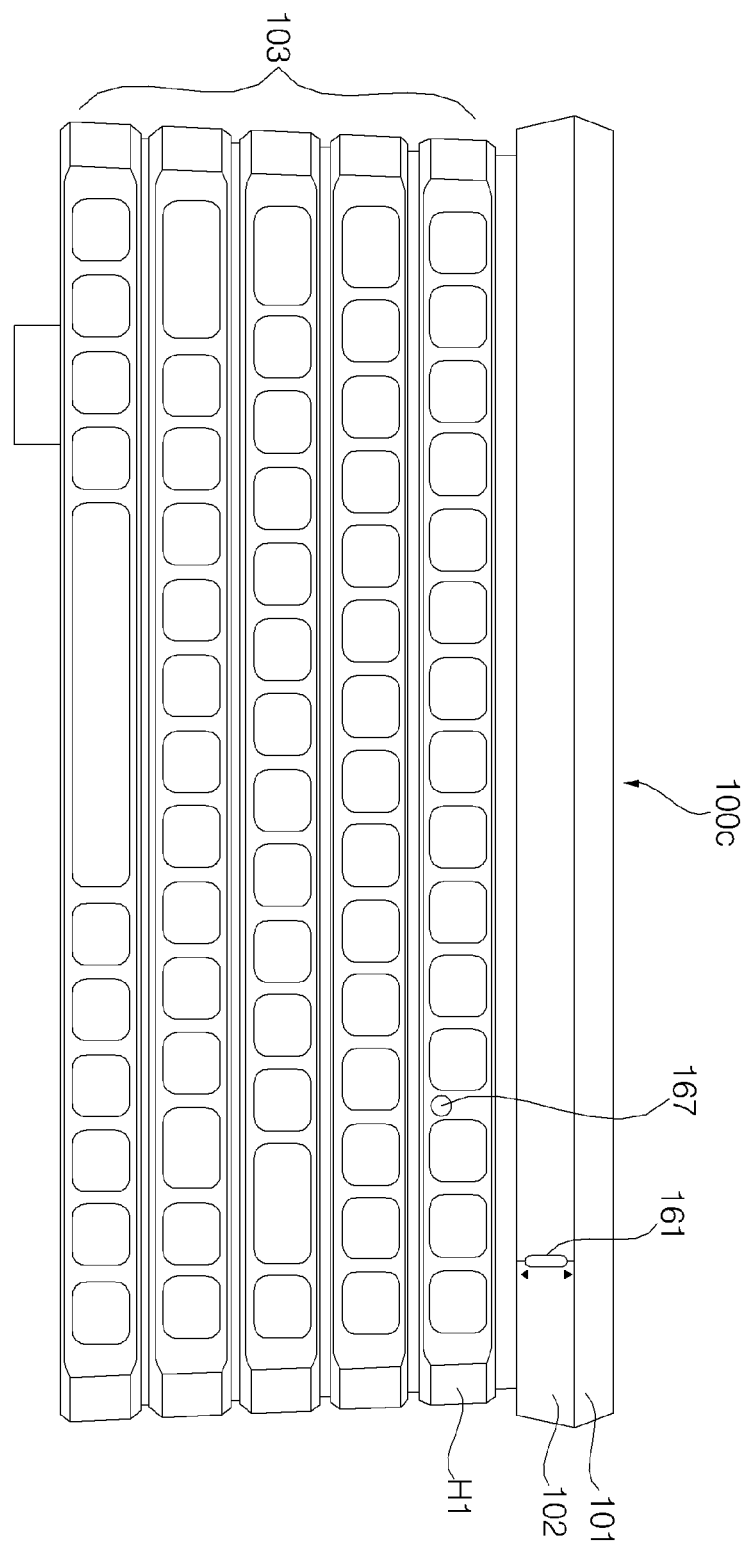
FIGS. 8A and 8B are diagrams illustrating a rolly keyboard according to another embodiment of the present invention.
Figure 8B:
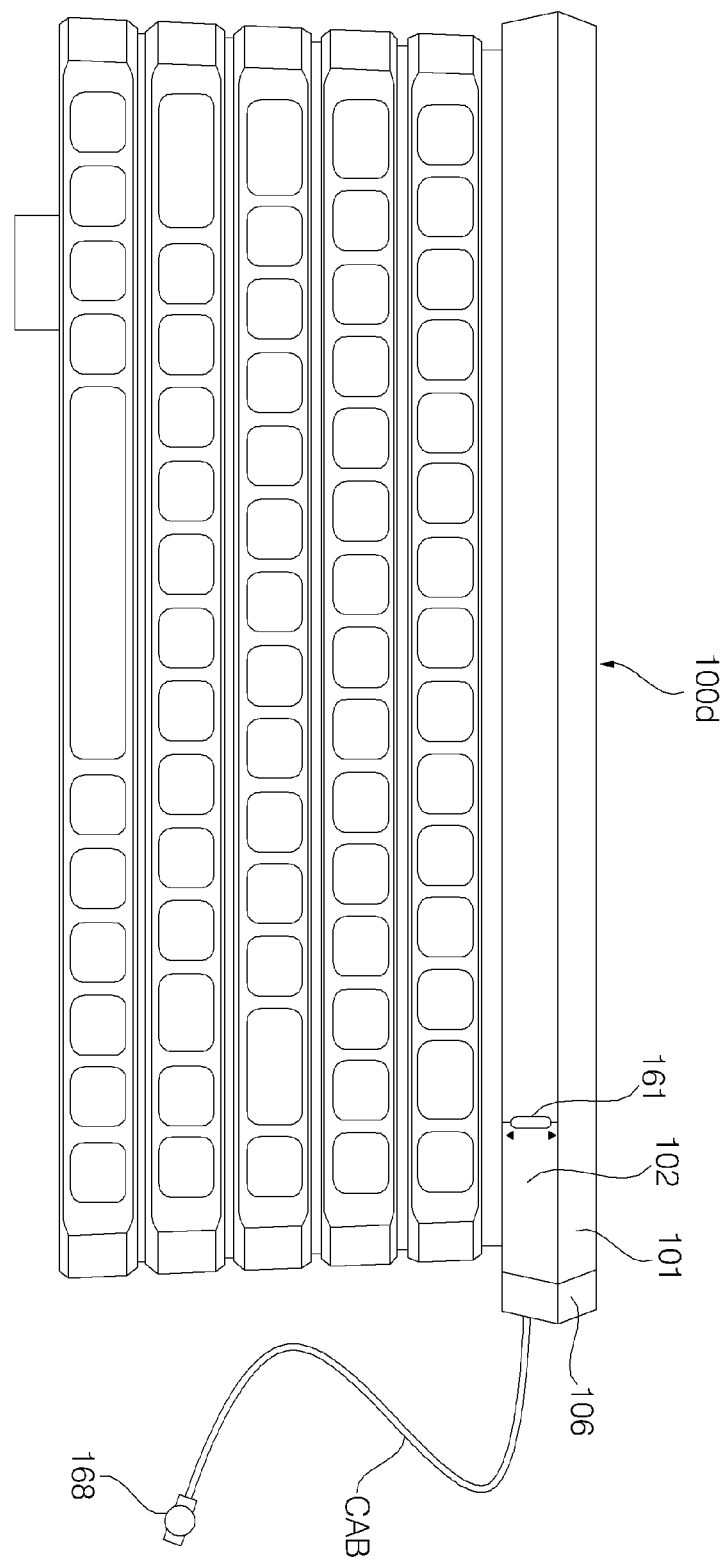

FIGS. 8A and 8B are diagrams illustrating a rolly keyboard according to another embodiment of the present invention.

Referring to FIG. 8A, the rolly keyboard 100*c* according to another embodiment of the present invention is similar to the rolly keyboard 100 of FIG. 4, but has a difference in that an optical mouse 167 disposed in any one of the plurality of key line portions H1 to H5 or in the body 101 is further provided.

In the drawing, it is illustrated that the optical mouse 167 is disposed in the first key line portion H1 of the plurality of key line portions H1 to H5, but the optical mouse 167 may be disposed in various positions.

When user moves the optical mouse 167 while using his or her finger, i.e., in the case of flicking, a pointing movement signal corresponding to the moving direction of the finger is generated, and the processor 170 may control to transmit the pointing movement signal to the display apparatus 300.

In addition, the rolly keyboard 100*b* of FIG. 6 also may further include the optical mouse 167 disposed in any one of the plurality of key line portions H1 to H5 or in the body 101.

Referring to FIG. 8B, the rolly keyboard 100*d* according to another embodiment of the present invention is similar to the rolly keyboard 100 of FIG. 4, but has a difference in that a cable CAB connected and extended from the end of the body 101, and a mouse 168 connected to the cable CAB are further included.

Specifically, when a lid 106 positioned in one end of the body 10 is opened, a cable CAB connected and extended from the end of the body 101 and a mouse 168 connected to the cable CAB may be protruded to the outside.

This mouse 168 is a finger mouse. When user moves the mouse 168 while using his or her finger, a pointing movement signal corresponding to the moving direction of the finger is generated, and the processor 170 may control to transmit the pointing movement signal to the display apparatus 300.

Meanwhile, the rolly keyboard 100*b* of FIG. 6 may also further include a cable CAB connected and extended from the end of the body 101 and a mouse 168 connected to the cable CAB.

Figure 9A:
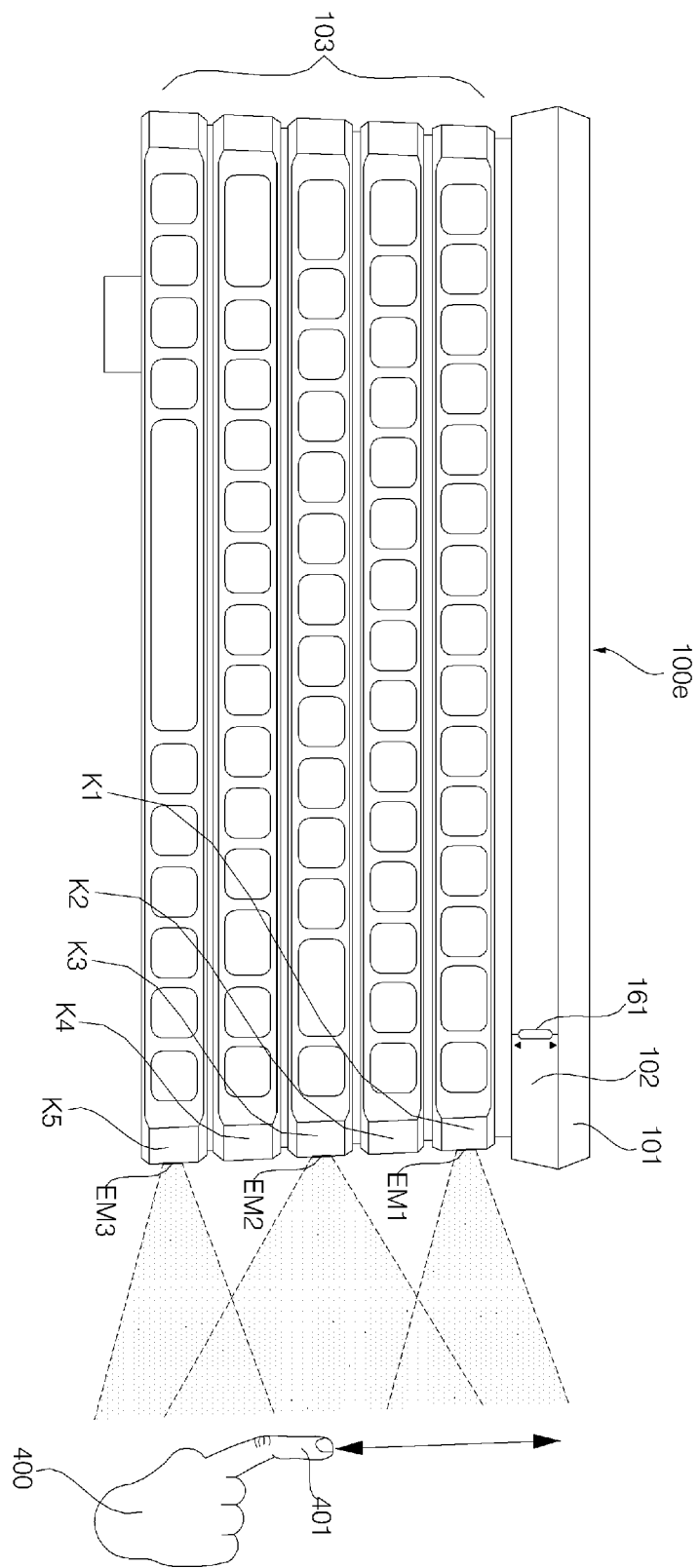
FIG. 9A is a diagram illustrating a rolly keyboard according to another embodiment of the present invention.
Figure 9B:
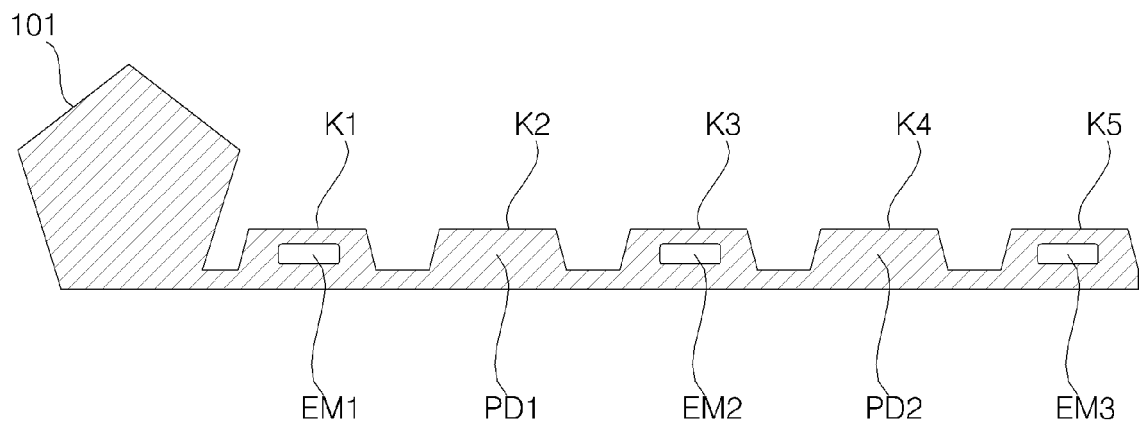
FIG. 9B is a side view of the rolly keyboard of FIG. 9A.

FIG. 9A is a diagram illustrating a rolly keyboard according to another embodiment of the present invention, and FIG. 9B is a side view of the rolly keyboard of FIG. 9A.

Referring to the drawings, a rolly keyboard 100*e* according to another embodiment of the present invention is similar to the rolly keyboard 100 of FIG. 4, but has a difference in that a light output unit EM1 to EM3 disposed in at least one of the plurality of key line portions H1 to H5 in the key assembly 103 and outputs a light to the surrounding area of the key assembly 103, and a light reception unit PD1 to PD2 disposed in at least one of the plurality of key line portions H1 to H5 in the key assembly 103 are further included.

Specifically, the light output unit EM1 to EM3 for outputting light may be disposed in the lateral of a first key K1, a third key K3, and a fifth key K5 of the plurality of key line portions H1 to H5 in the key assembly 103, and the light reception unit PD1 to PD2 for receiving a light may be disposed in the lateral of a second key K2 and a fourth key K4 of the plurality of key line portions H1 to H5 in the key assembly 103.

Based on the output light outputted from the light output unit EM1 to EM3 and the reception light received by the light reception unit PD1 to PD2, the processor 170 may detect movement information of user's hand 400, and control to transmit the movement information to the display apparatus 300 as pointing data. Thus, even if there is no separate mouse, the pointing data corresponding to the mouse may be obtained based on the output light and the reception light.

Meanwhile, the rolly keyboard 100*b* of FIG. 6 may also further include the light output unit EM1 to EM3 disposed in at least one of the plurality of key line portions H1 to H5 in the key assembly 103 and outputs a light to the surrounding area of the key assembly 103, and a light reception unit PD1 to PD2 disposed in at least one of the plurality of key line portions H1 to H5 in the key assembly 103.

Figure 10A:
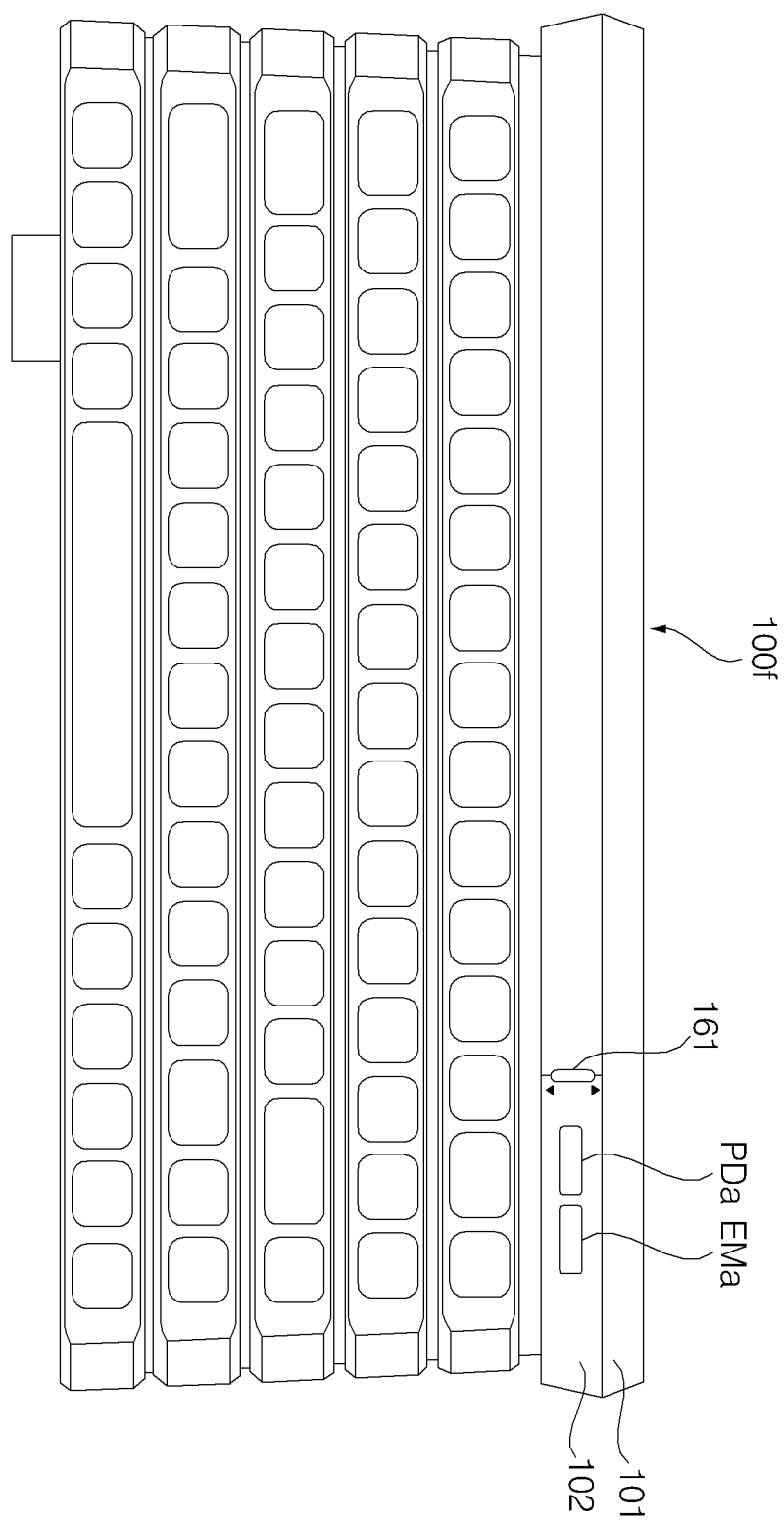
FIG. 10A is a diagram illustrating a rolly keyboard according to another embodiment of the present invention.
Figure 10B:
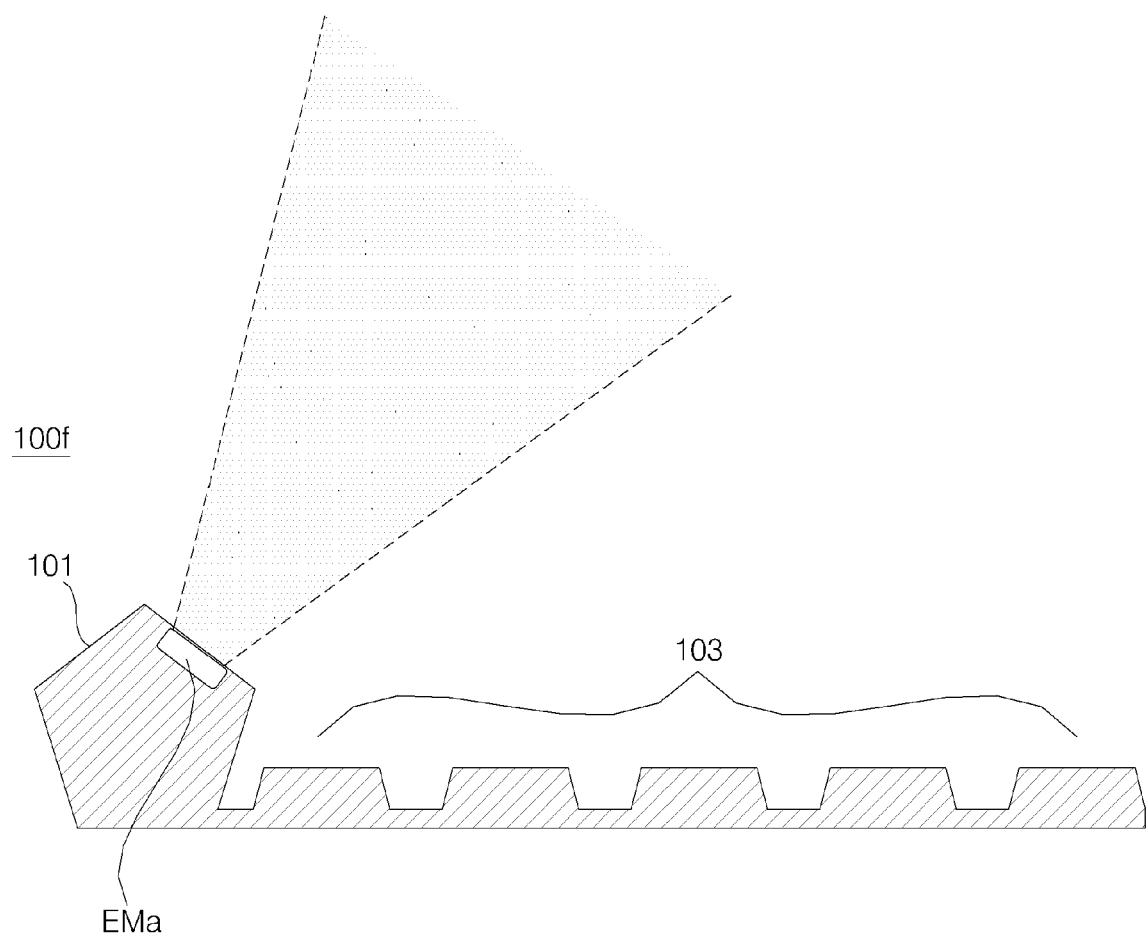
FIG. 10B is a side view of the rolly keyboard of FIG. 10A.

FIG. 10A is a diagram illustrating a rolly keyboard according to another embodiment of the present invention, and FIG. 10B is a side view of the rolly keyboard of FIG. 10A.

Referring to the drawings, a rolly keyboard 100*f* according to another embodiment of the present invention is similar to the rolly keyboard 100 of FIG. 4, but has a difference in that an infrared light output unit EMa disposed in the body 101 and outputs an infrared light, and an infrared light reception unit PDa which receives a reception light corresponding to the outputted infrared light are further included.

The processor 170 may control to supply power to the communication unit 145 when a sensing signal is detected by the infrared sensor unit 131 in a state where the key assembly 103 is unfolded from the body 101. Thus, unnecessary power consumption may be reduced.

In addition, the rolly keyboard 100*b* of FIG. 6 also may further include the infrared light output unit EMa disposed in the body 101 and outputs an infrared light, and an infrared light reception unit PDa which receives a reception light corresponding to the outputted infrared light.

Figure 11A:
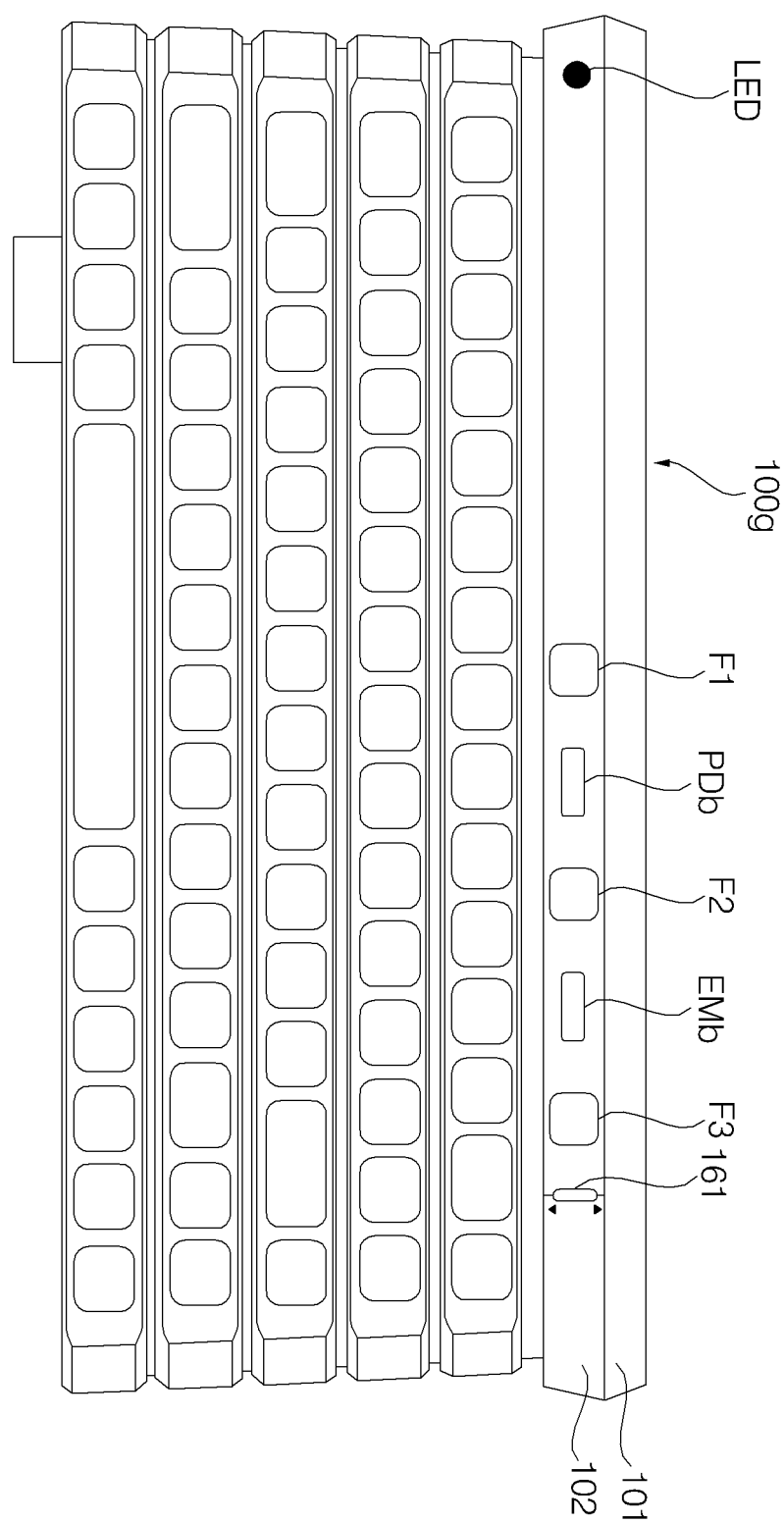
FIG. 11A is a diagram illustrating a rolly keyboard according to another embodiment of the present invention.
Figure 11B:
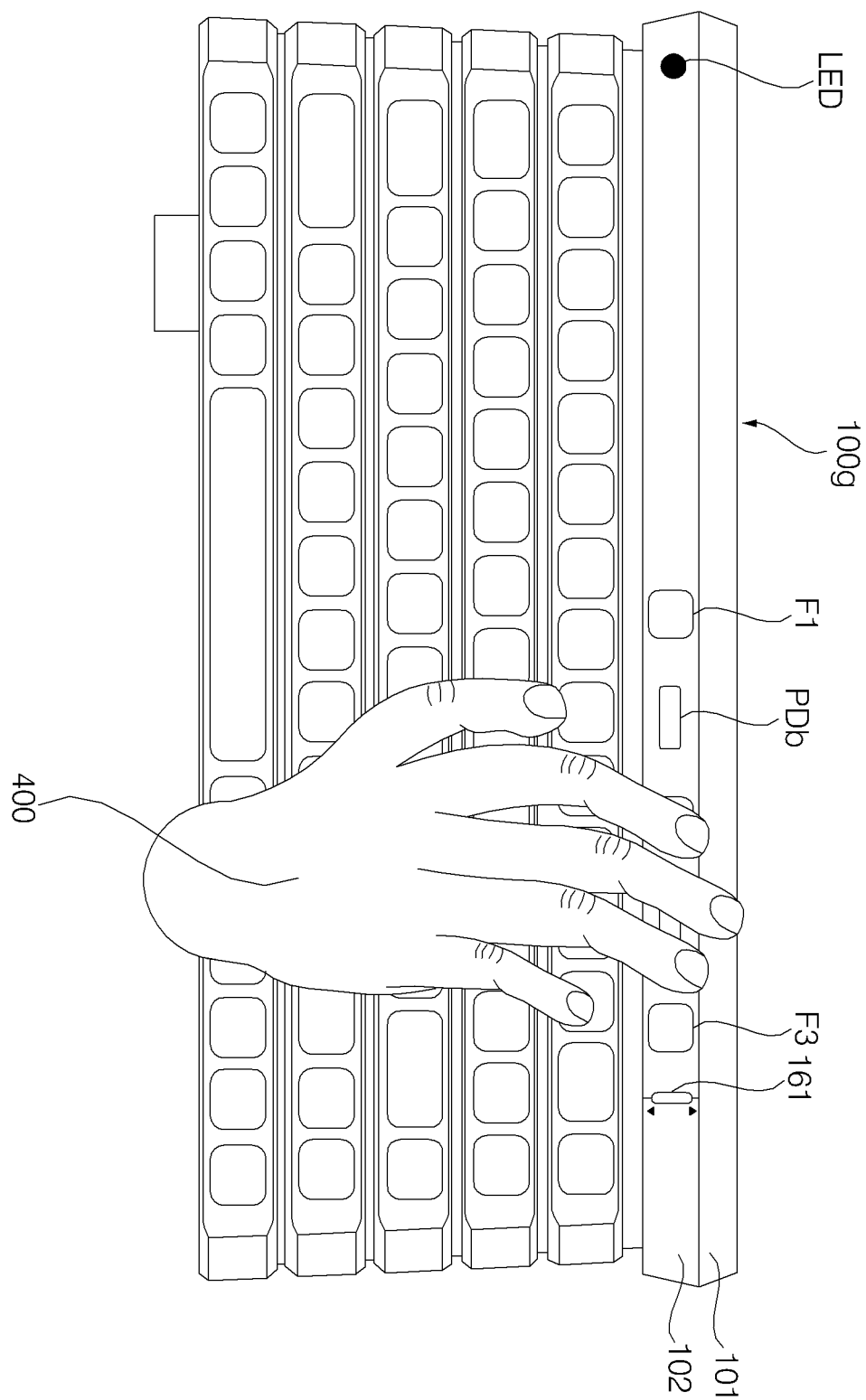
FIG. 11B is a side view of the rolly keyboard of FIG. 11A.

FIG. 11A is a diagram illustrating a rolly keyboard according to another embodiment of the present invention, and FIG. 11B is a side view of the rolly keyboard of FIG. 11A.

Referring to the drawings, a rolly keyboard 100*g* according to another embodiment of the present invention is similar to the rolly keyboard 100 of FIG. 4 but has a difference in that an infrared light output unit EMb disposed in the body 101 and outputs an infrared light, an infrared light reception unit PDb which receives a reception light corresponding to the outputted infrared light, and a plurality of function keys F1, F2, F3 are further included.

The processor 170 may control to supply power to the communication unit 145 when a sensing signal is detected by the infrared sensor unit 131 in a state where the key assembly 103 is unfolded from the body 101. Thus, unnecessary power consumption may be reduced.

Meanwhile, when any one of the plurality of function keys F1, F2, F3 is selected, the processor 170 may control to transmit corresponding function operation data to the display apparatus 300.

Meanwhile, the rolly keyboard 100*b* of FIG. 6 also may further include the infrared light output unit EMb disposed in the body 101 and outputs an infrared light, an infrared light reception unit PDb which receives a reception light corresponding to the outputted infrared light, and a plurality of function keys F1, F2, F3.

Figure 12A:
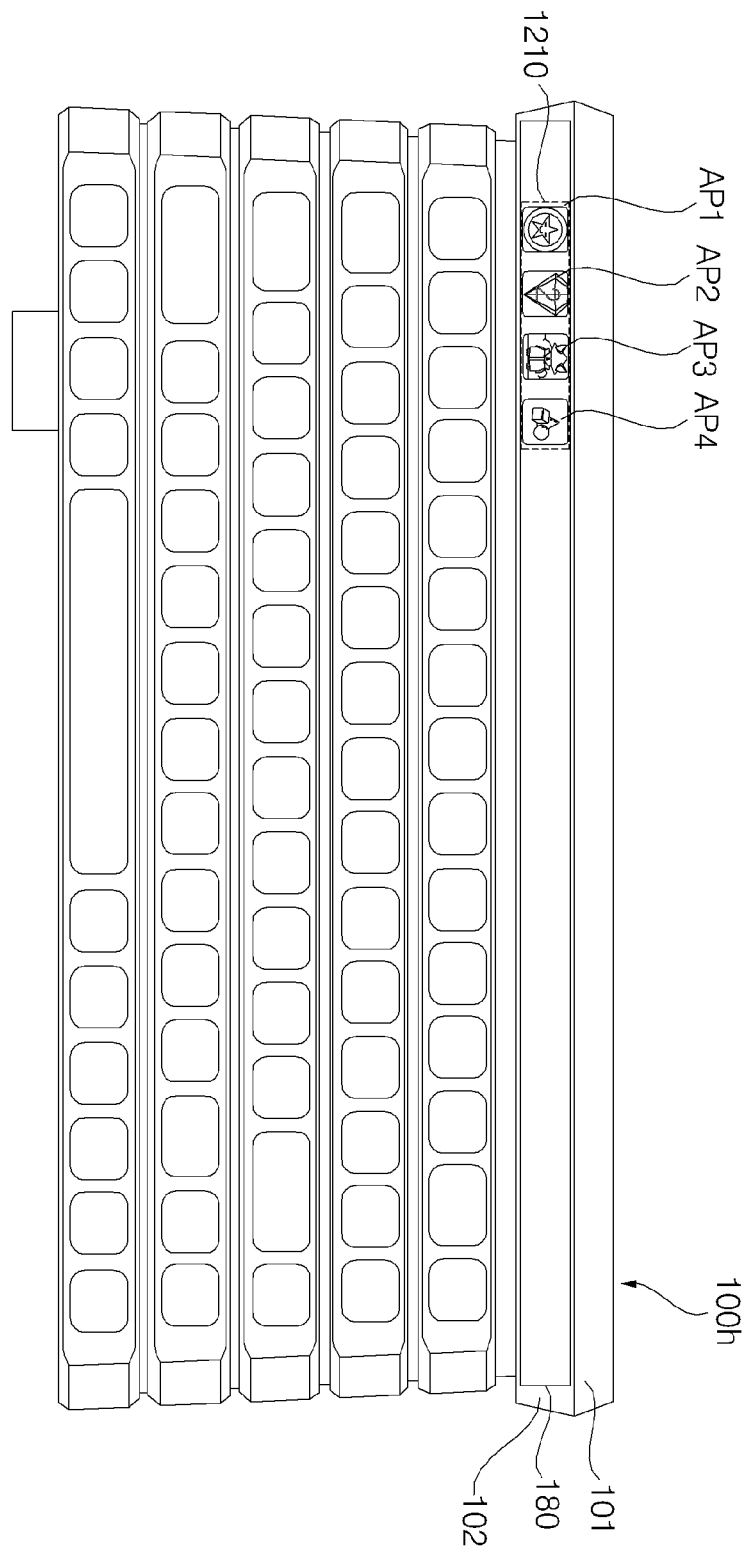
FIG. 12A is a diagram illustrating a rolly keyboard according to another embodiment of the present invention.
Figure 12B:
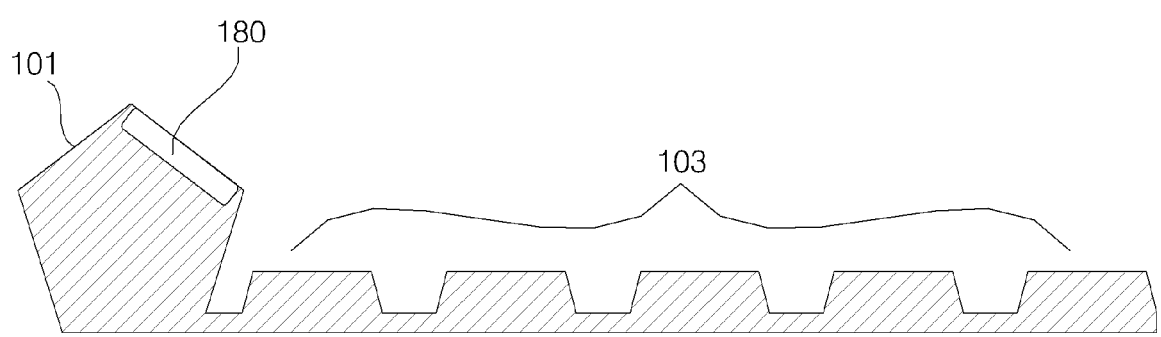
FIG. 12B is a side view of the rolly keyboard of FIG. 12A.

FIG. 12A is a diagram illustrating a rolly keyboard according to another embodiment of the present invention, and FIG. 12B is a side view of the rolly keyboard of FIG. 12A.

Referring to the drawings, a rolly keyboard 100*g* according to another embodiment of the present invention is similar to the rolly keyboard 100 of FIG. 4, but has a difference in that a display 180 is provided instead of the scroll wheel 161.

That is, the rolly keyboard 100*h* according to another embodiment of the present invention includes a body 101 having a polygonal columnar shape, a display 180 formed on the body 101, and a key assembly 103 which is coupled to the body 101 and has a plurality of keys disposed therein. The key assembly 103 includes a plurality of key line portions H1 to H5 in which the keys are disposed in each of a plurality of lines, and the plurality of key line portions H1 to H5 are wound in the polygonal columnar shape of the body 101. Accordingly, various information can be displayed on the display, thereby enhancing the usability of a user.

The processor 170 may control to display a corresponding application icon on the display 180, based on application information received from the display apparatus 300 through the communication unit 145.

Alternatively, the processor 170 may receive information related to a widget, an application, and the like, being displayed in the paired display apparatus 300, and may control to display a widget, icon and an application icon.

Meanwhile, the processor 170 may control to transmit first key data to the display apparatus 300 during the operation of the first key of the plurality of keys.

Meanwhile, the display 180 may be a touch screen capable of receiving a touch input.

Accordingly, through the display 180, a scrolling input, a pointing input such as a mouse, a drag input, and the like can be performed.

For example, when a user moves a finger while moving a finger in one area of the display 180 implemented by a touch screen, a pointing movement signal is generated according to the moving direction of the finger, and the processor 170 controls to transmit the pointing movement signal to the display apparatus 300.

Meanwhile, when a first application icon of the application icons displayed on the display 180 is selected by touch input, or the like, the processor 170 may control to transmit first application execution information to the display apparatus 300, and to transmit first key data to the display apparatus 300 during operation of a first key of the plurality of keys.

Meanwhile, the rolly keyboard 100*h* according to another embodiment of the present invention may further include at least one of the scroll wheel 161, the optical mouse 167, the mouse 168, the infrared light output unit EMa, the infrared light reception unit PDa, the light output unit EM1 to EM3, and the light reception unit PD1 to PD2.

For example, based on the output light outputted from the light output unit EM1 to EM3 and the reception light received by the light reception unit PD1 to PD2, the processor 170 may detect movement information of user's hand 400, and control to transmit the movement information to the display apparatus 300 as pointing data. Thus, even if there is no separate mouse, the pointing data corresponding to the mouse may be obtained based on the output light and the reception light.

For another example, the processor 170 may control to supply power to the communication unit 145, when a sensing signal is detected by the infrared sensor unit 131 in a state where the key assembly 103 is unfolded from the body 101. Thus, unnecessary power consumption may be reduced.

Meanwhile, after the power is supplied, the processor 170 may control to perform a pairing with the display apparatus 300. After completing the pairing, the processor 170 may receive information on the widget, application, and the like being displayed on the paired display apparatus 300, and control to display a widget icon or an application icon.

FIG. 12A illustrates that a screen 1210 including a plurality of application items Ap1 to AP4 is displayed on the display 180. Accordingly, a user may easily check the application item displayed on the display apparatus 300 through the rolly keyboard.

Meanwhile, the rolly keyboard 100*h* of FIG. 12 may further include the scroll wheel 161, the light output unit EM1 to EM3 disposed in at least one of the plurality of key line portions H1 to H5 in the key assembly 103 and outputs a light to the surrounding area of the key assembly 103, and the light reception unit PD1 to PD2 disposed in at least one of the plurality of key line portions H1 to H5 in the key assembly 103.

Figure 13A:
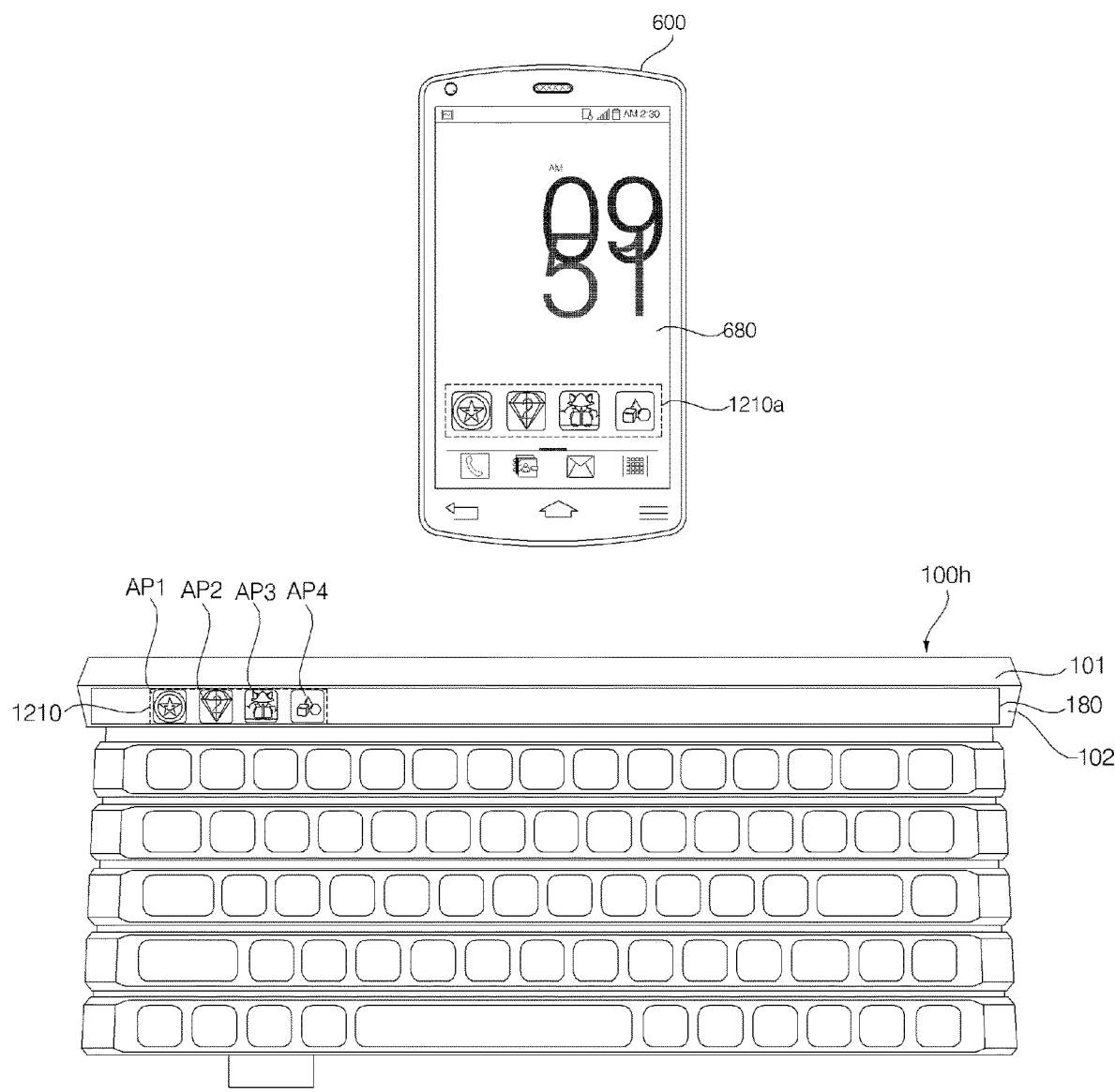
FIGS. 13A and 13B are diagrams for explaining the operation of the rolly keyboard of FIG. 13A.
Figure 13B:
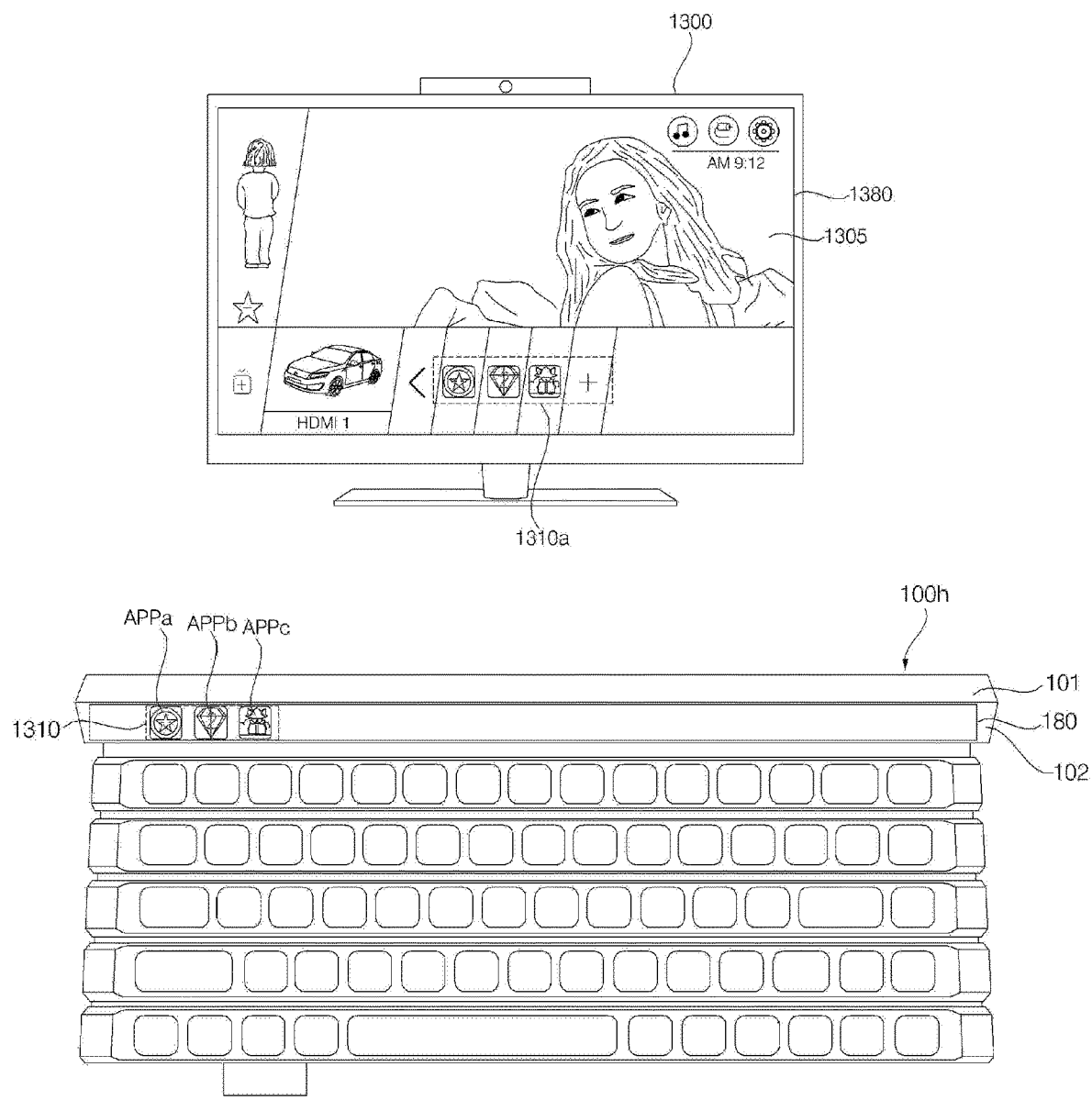

FIGS. 13A and 13B are diagrams for explaining the operation of the rolly keyboard of FIG. 13A.

Firstly, FIG. 13A is an example of a display apparatus, and illustrates that a mobile terminal 600 and a rolly keyboard 100h are paired and operated.

When the application screen 1210a is displayed on the display 680 of the mobile terminal 600, the rolly keyboard may receive application information and display, on the display 180, an application screen 1210 including a plurality of application icons AP1 to Ap4.

Next, FIG. 13B is an example of a display apparatus and illustrates that TV 1300 and the rolly keyboard 100h are paired and operated.

When the application screen 1305 is displayed on the display 1380 of the TV 1300, the rolly keyboard may receive application information and display, on the display 180, an application screen 1310 including a plurality of application icons APPa to APPc. Accordingly, the convenience of use for a user may be increased.

The rolly keyboard according to the embodiment of the present invention is not limited to the configuration and the method of the embodiments described above, but all or some of the embodiments may be selectively combined and configured to achieve various modifications.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A rolly keyboard comprising:
   a body having a polygonal columnar shape;
   a scroll wheel formed in the body;
   a key assembly coupled to the body;
   a communication unit to exchange data with an external display apparatus;
   a processor configured to transmit scroll operation data to the external display apparatus, when the scroll wheel is operated; and
   an infrared sensor unit including an infrared light output unit disposed in the body and to output an infrared light, and an infrared light reception unit to receive a reception light corresponding to the infrared light,
   wherein the processor controls to supply power to the communication unit, when a sensing signal is detected by the infrared sensor unit in a state in which the key assembly is unfolded from the body,
   wherein the key assembly comprises a plurality of key line portions in keys are disposed in each of a plurality of lines, and
   wherein the plurality of key line portions are wound in the polygonal columnar shape of the body.

2. The rolly keyboard of claim 1, wherein the scroll wheel comprises:
   a wheel base including a first base and a second base, the second base connected to the first base and having a curved shape;
   a bearing disposed on the wheel base; and
   a wheel cover disposed on the bearing.

3. The rolly keyboard of claim 2, wherein the first base is a straight base, and the second base is a curved base.

4. The rolly keyboard of claim 1, further comprising:
   a cable connected and extended from an end of the body; and
   a mouse connected to the cable.

5. The rolly keyboard of claim 4, wherein the cable and the mouse connected to the cable are protruded to the outside, when a lid positioned in the end of the body is opened.

6. The rolly keyboard of claim 1, further comprising an optical mouse disposed in any one of the plurality of key line portions or in the body.

7. The rolly keyboard of claim 1, further comprising:
   a light output unit disposed in at least one of the plurality of key line portions in the key assembly and outputs a light to a surrounding area of the key assembly; and
   a light reception unit disposed in at least one of the plurality of key line portions in the key assembly,
   wherein the processor is configured to detect movement information of a user's hand, based on an output light outputted from the light output unit and a reception light received by the light reception unit, and to transmit the movement information, as pointing data, to the external display apparatus.

8. The rolly keyboard of claim 1, wherein a portion of the plurality of key line portions includes a plurality of function keys,
   wherein the processor controls to transmit corresponding function operation data to the external display apparatus, when any one of the plurality of function keys is selected.

9. A rolly keyboard comprising:
   a body having a polygonal columnar shape;
   a key assembly coupled to the body;
   a communication unit to exchange data with an external display apparatus;
   a processor configured to transmit scroll operation data to the external display apparatus, when the scroll wheel is operate; and
   an infrared sensor unit including an infrared light output unit disposed in the body and to output an infrared light, and an infrared light reception unit to receive a reception light corresponding to the infrared light,
   wherein the processor controls to supply power to the communication unit, when a sensing signal is detected by the infrared sensor unit in a state in which the key assembly is unfolded from the body,
   wherein the key assembly comprises:
   a plurality of key line portions in which keys are disposed in each of a plurality of lines; and
   a scroll wheel formed in any one of the plurality of key line portions, and
   wherein the plurality of key line portions are wound in the polygonal columnar shape of the body.

10. The rolly keyboard of claim 9, wherein the scroll wheel comprises:
    a wheel base including a first base and a second base, the second base connected to the first base and having a curved shape;
    a bearing disposed on the wheel base; and
    a wheel cover disposed on the bearing.

11. The rolly keyboard of claim 9, further comprising an optical mouse disposed in any one of the plurality of key line portions or in the body.

12. The rolly keyboard of claim 9, further comprising:
a light output unit disposed in at least one of the plurality of key line portions in the key assembly and to output a light to a surrounding area of the key assembly; and
a light reception unit disposed in at least one of the plurality of key line portions in the key assembly,
wherein, based on the output light outputted from the light output unit and a reception light received by the light reception unit, the processor is configured to detect movement information of user's hand, and to transmit the movement information, as pointing data, to the external display apparatus.

13. A rolly keyboard comprising:
a body having a polygonal columnar shape;
a display formed in the body;
a key assembly coupled to the body;
a communication unit to exchange data with an external display apparatus;
a processor configured to transmit scroll operation data to the external display apparatus, when the scroll wheel is operated; and
an infrared sensor unit including an infrared light output unit disposed in the body and to output an infrared light, and an infrared light reception unit to receive a reception light corresponding to the infrared light,
wherein the processor controls to supply power to the communication unit, when a sensing signal is detected by the infrared sensor unit in a state in which the key assembly is unfolded from the body,
wherein the key assembly comprises a plurality of key line portions in which keys are disposed in each of a plurality of lines, and
wherein the plurality of key line portions are wound in the polygonal columnar shape of the body.

14. The rolly keyboard of claim 13, wherein the processor controls to transmit first application execution information to the external display apparatus, when a first application icon of the application icons displayed on the display is selected, and controls to transmit first key data to the external display apparatus, when a first key of the plurality of keys is operated.

15. The rolly keyboard of claim 13, wherein the processor is configured to transmit a pointing movement signal to the external display apparatus, when the display includes a touch screen and a flicking occurs in one area of the display.

* * * * *